Jan. 22, 1929.   C. A. PARSONS ET AL   1,699,628
DYNAMO ELECTRIC MACHINE
Filed Aug. 27, 1927

Inventors:
Charles Algernon Parsons &
Jessel Rosen,
by Spear, Middleton Donaldson & Hall
Attys.

Patented Jan. 22, 1929.

1,699,628

UNITED STATES PATENT OFFICE.

CHARLES ALGERNON PARSONS AND JESSEL ROSEN, OF NEWCASTLE-ON-TYNE, ENGLAND; SAID ROSEN, ASSIGNOR TO SAID PARSONS.

DYNAMO-ELECTRIC MACHINE.

Application filed August 27, 1927, Serial No. 215,938, and in Great Britain October 7, 1926.

The invention relates to alternating-current dynamo-electric machines of the enclosed type in which end shields are used which serve the double purpose of protecting the high-tension armature windings and rotor and also of affording a containing envelope for the cooling air.

It has been found in practice that the cast-iron end shields hitherto commonly used especially in large alternators cause an appreciable electrical loss due to the formation of eddy currents and a resulting considerable rise of temperature, and it is a main object of the present invention to eliminate this loss.

With such an object, the present invention consists in an alternating-current dynamo-electric machine comprising the combination of features hereinafter described and particularly pointed out in the claims.

Referring to the accompanying diagrammatic drawings:—

Figure 1:
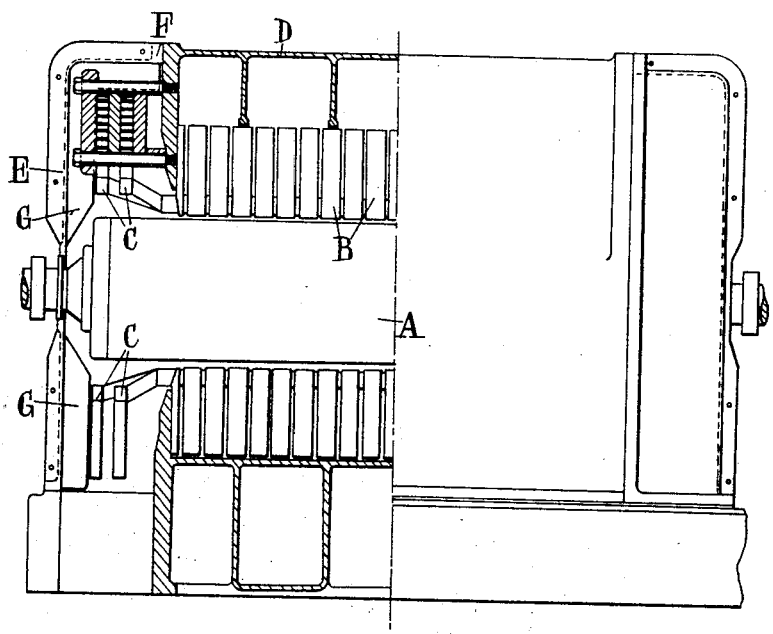
Figure 2:
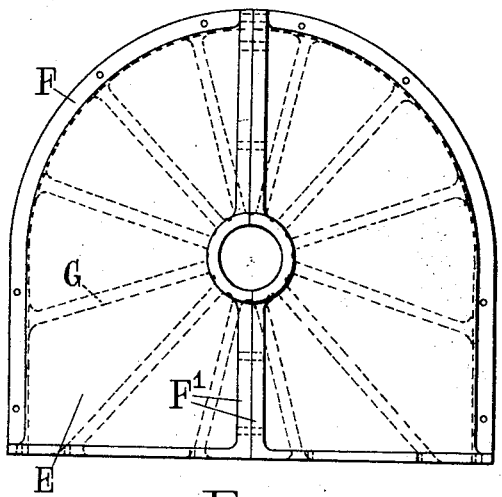
Figure 3:
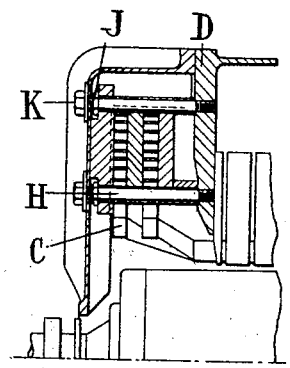

Figure 1 shows a longitudinal elevation, in section as regards its left-hand half, of an alternator fitted with end shields according to one form of the invention, Figure 2 being a corresponding end view of the shield; while finally Figure 3 shows a modified method of securing an end shield in place.

The same reference symbols are used in the different figures to denote corresponding parts.

In carrying the invention into effect according to the form shown in Figures 1 and 2 applied to an alternator, the rotor, A, is arranged within the stator, B, the end windings, C, of which project in the usual manner. The body of the alternator is enclosed in a metal casing, D, which as regards length is substantially co-terminous with the armature.

In accordance with the present invention, the end shield, E, of dished or other suitable hollow form may be made of wood which may be treated to render it non-inflammable and be secured direct by suitable flanges, F, or otherwise to the main body, D, of the casing.

Internal guides or baffles, G, may be arranged on the inside of the shield integrally therewith, such baffles serving not only to stiffen the shields but to guide the cooling air through the windings.

According to a modified form, (see Figure 3) the shields, E, may be secured in place by means of the studs, H, which support the stator end windings, a lock-nut, J, being first threaded on each stud, H, to hold the end windings in place independently of the other nuts, K, which secure the end shield.

For ease of manufacture and assembly, the end shields may if desired be built in two or more sections, (see Figure 2) provided with flanges, F', as required for securing the sections to each other.

Moreover, instead of wood, asbestos cloth may be substituted using for example as a binder, a varnish of the kind known by its registered trade mark, bakelite or formite.

By the use of non-metallic and therefore non-magnetic end shields as described, the following advantages are secured:—

(a) The temperature of the end shields is not substantially higher than the surrounding air;

(b) The efficiency of the dynamo-electric machine is increased;

(c) The end shields can be arranged in closer proximity to the end windings without danger of overheating or breakdown, thereby shortening the machine;

(d) If an explosion should occur within the end shields, the danger of flying metal is avoided; and (e) The shields are lighter and easier to handle.

While the invention has been described above as applied to an alternator, it is evident that it is equally applicable to other forms of alternating-current dynamo-electric machine.

Having now described our invention, what we claim as new and desire to secure by Letters Patent is:—

1. An alternating-current dynamo-electric machine, comprising in combination a stator member having an enclosing casing and a rotor member, one of said members including armature windings parts of which project beyond the end of said casing together with an end shield of non-metallic material enclosing the projecting parts of said windings.

2. An alternating-current dynamo-electric machine, comprising in combination a stator member having armature windings and a casing, the end windings of said armature windings projecting beyond said casing, a rotor member co-axially disposed within said stator and an end shield of non-metallic material enclosing said end windings and attached to said casing.

3. An alternating-current dynamo-electric machine as claimed in claim 1, in which said casing is of metallic and said end shield of non-metallic material.

4. An alternating-current dynamo-electric machine as claimed in claim 1, having means for supporting the projecting parts of said windings, said supporting means including fastening means for attaching said end shield to said casing.

5. An alternating-current dynamo-electric machine as claimed in claim 1, in which the end shield is provided with integral air-guiding ribs.

In testimony whereof we have signed our names to this specification.

CHARLES ALGERNON PARSONS.
JESSEL ROSEN.